US012617632B2

(12) United States Patent
Brinckmann et al.

(10) Patent No.: US 12,617,632 B2
(45) Date of Patent: May 5, 2026

(54) GRIPPER SYSTEM FOR AN OPHTHALMIC LENS

(71) Applicant: Alcon Inc., Fribourg (CH)

(72) Inventors: Felix Brinckmann, Roßdorf (DE); Michel Mühlig, Schaafheim (DE); Johannes Neumann, Obernburg am Main (DE); Nils Schweizer, Bad König (DE); Roger Biel, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 252 days.

(21) Appl. No.: 18/597,071

(22) Filed: Mar. 6, 2024

(65) Prior Publication Data

US 2024/0300751 A1      Sep. 12, 2024

Related U.S. Application Data

(60) Provisional application No. 63/450,787, filed on Mar. 8, 2023.

(51) Int. Cl.
*B65G 47/91*        (2006.01)
*B25J 15/06*        (2006.01)
(52) U.S. Cl.
CPC ........ *B65G 47/918* (2013.01); *B25J 15/0616* (2013.01)
(58) Field of Classification Search
CPC ........................... B25J 15/0616; B65G 47/918
See application file for complete search history.

(56) References Cited

U.S. PATENT DOCUMENTS 5,505,654 A * 4/1996 Wood ................. B24B 13/0052
                                                        451/6
5,528,878 A * 6/1996 Edwards ............ G05B 19/4189
                                                        53/54
5,578,331 A * 11/1996 Martin ............... B29D 11/0024
                                                        264/2.6
5,804,107 A * 9/1998 Martin ............... B29D 11/0048
                                                        425/347
5,814,134 A * 9/1998 Edwards .......... B29D 11/00125
                                                        95/266
5,820,673 A * 10/1998 Sentilles .......... B29D 11/00865
                                                        118/643

(Continued)

FOREIGN PATENT DOCUMENTS

EP        1136241 B1     6/2006
WO        03016855 A1    2/2003
WO      2018185630 A1   10/2018

*Primary Examiner* — Saul Rodriguez
*Assistant Examiner* — Brendan P Tighe
(74) *Attorney, Agent, or Firm* — Sheng-Hsin Hu

(57)        ABSTRACT

A gripper system comprises:
    a gripper shaft;
    a vacuum source;
    a first valve arranged between the vacuum source and the suction tube;
    a liquid reservoir;
    a source of pressurized gas;
    a second valve arranged between the source of pressurized gas and the suction tube or the liquid reservoir;
    a control unit for controlling the first valve and the second valve such that:
    for picking the ophthalmic lens up, suction is supplied to the suction tube;
    during transporting the ophthalmic lens, the suction tube is filled with liquid from the liquid supply tube;
    for releasing the ophthalmic lens from the gripper head, liquid is pressed through the fluid channel and through the suction opening of the gripper head.

10 Claims, 9 Drawing Sheets

(56)     References Cited

U.S. PATENT DOCUMENTS

| | | | |
|---|---|---|---|
| 5,829,222 A * | 11/1998 | Schlagel | B65B 57/00 |
| | | | 198/689.1 |
| 6,068,464 A * | 5/2000 | Su | B29D 11/00528 |
| | | | 249/117 |
| 6,439,870 B1 * | 8/2002 | Marceau | B29D 11/00201 |
| | | | 425/111 |
| 2004/0074525 A1 | 4/2004 | Widman | |
| 2006/0055929 A1 * | 3/2006 | Shanbaum | B24B 49/00 |
| | | | 356/401 |
| 2010/0044893 A1 | 2/2010 | Biel | |
| 2021/0316414 A1 * | 10/2021 | Schneider | G01M 11/0264 |
| 2023/0347468 A1 * | 11/2023 | Schäfer | B24B 13/0031 |

* cited by examiner

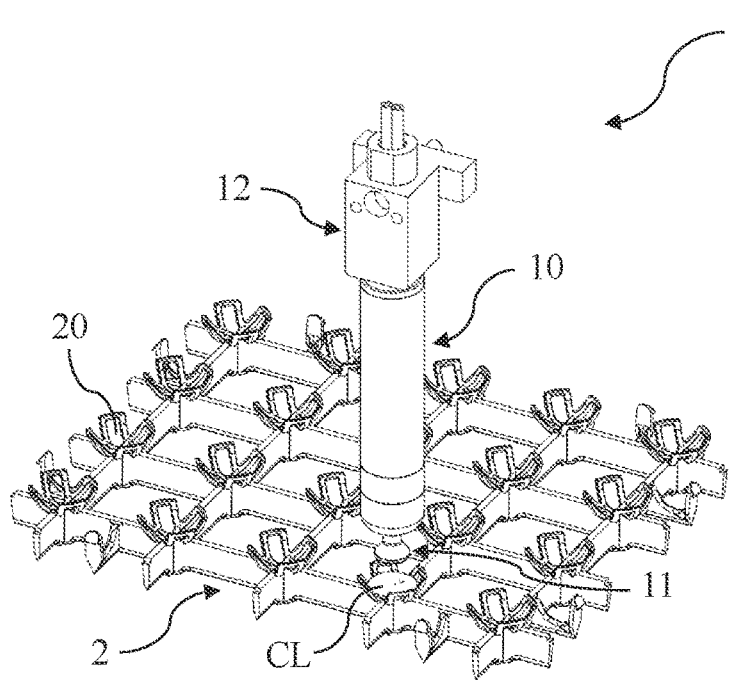
Fig. 1
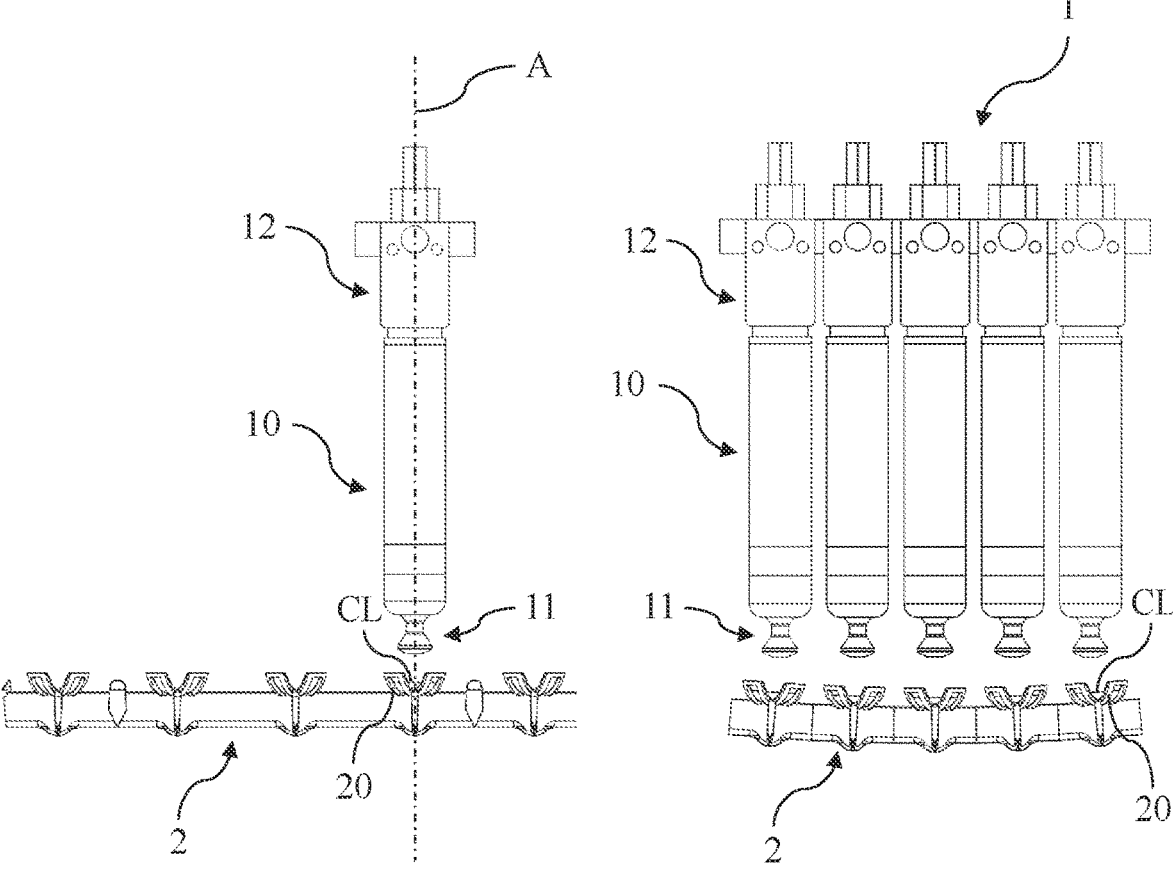
Fig. 2 Fig. 3

GRIPPER SYSTEM FOR AN OPHTHALMIC LENS

This application claims the benefits under 35 USC § 119 (e) of U.S. provisional application No. 63/450,787, filed on 8 Mar. 2023, incorporated by reference in its entirety.

FIELD OF THE DISCLOSURE

The invention relates to a gripper system for an ophthalmic lens such as a contact lens, and in particular a soft contact lens (e.g. a silicone hydrogel contact lens).

BACKGROUND

In the mass manufacture of ophthalmic lenses such as contact lenses, and in particular soft contact lenses (e.g. silicone hydrogel contact lenses), the contact lenses are transported through various stations in automated production lines. For example, in the manufacture of soft contact lenses made of silicone hydrogel materials, the lens-forming material is cured in a mold to form a contact lens, and subsequently the cured lens is removed from the mold, extracted and/or hydrated and/or coated, and is then inspected. Those contact lenses that have successfully passed inspection are then transferred to a packaging module for packaging.

As already described, in such automated production lines the contact lenses need to be transferred between several stations and/or modules of the production line. One such transfer takes place at a transfer station of a treatment module (in which the contact lenses are treated, e.g. extracted and/or hydrated and/or coated) where the contact lenses are transferred to an insertion station of a subsequent inspection module (in which the contact lenses are inspected) where the contact lenses are inserted into inspection cuvettes of the inspection module.

In the treatment module, the contact lenses are transported through various chemical treatment baths (including water baths) in the baskets of stacked treatment carriers, each basket accommodating a contact lens during transportation and treatment in the baths. Treatment carriers suitable for this purpose are known, for example, from WO 2018/185630. At the transfer station, a plurality of contact lenses are concurrently transferred from the baskets of an uppermost treatment carrier of a stack into a corresponding plurality of inspection cuvettes—one lens from one basket into one inspection cuvette, respectively. Inspection cuvettes suitable for this purpose are known, for example, from WO 03/016855.

The transfer of the contact lenses from the baskets into the inspection cuvettes is typically performed with the aid of grippers. To perform the transfer, at the transfer station of the treatment module a plurality of grippers is arranged above the baskets of the treatment carriers and is lowered to a predetermined lowermost axial position (z-position, lens pick-up position) in which a convex distal end face of a respective gripper touches the concave back surface of a respective contact lens or is arranged a very small distance above the respective contact lens. The gripper has one or more suction openings in its convex distal end face through which vacuum/suction is then applied to pick the contact lens up and make it adhere to the distal end face of the gripper.

Once a said contact lens has been picked up by a said gripper and adheres to the distal end face thereof, the gripper with the contact lens adhered thereto is moved to the corresponding inspection cuvette and is then lowered into the inspection cuvette to another predetermined lowermost axial position (z-position, lens release position) in which the distal end face of the gripper with the contact lens adhered thereto is immersed in a liquid (e.g. water) contained in the inspection cuvette. Application of suction is then terminated and pressurized air is applied instead ('overpressure pulse') while concurrently the gripper is moved upwards, thus releasing ('blowing off') the contact lens from the distal end surface of the gripper and allowing the released contact lens in the liquid to settle down on the bottom of the inspection cuvette. For the subsequent inspection of the contact lens, the cuvette is pivoted to an inspection position in which automatic inspection of the lens is performed by a camera through a viewing glass of the inspection cuvette (see WO 03/016855).

While this method is known to work well, there are a few problems that may arise in the afore-described process of picking the contact lens up from the basket of the treatment carriers with the aid of the afore-described gripper, transporting the contact lens adhered to the gripper and subsequently releasing it from the distal end face of the gripper into the liquid contained in the inspection cuvette.

First of all, the grippers are typically stiff rigid grippers. This may be disadvantageous as not all of the treatment carriers are perfectly even and do not perfectly extend in a horizontal plane (x-y-plane) perpendicular to the axis of movement of the grippers (z-axis). For example, the treatment carriers may be very slightly curved (like a shallow dish) rather than being perfectly plane. As a consequence, the predetermined lowermost axial position of the grippers (lens pick-up position) may lead to the scenario that the convex distal end face of a gripper associated to a particular basket of the treatment carrier touches the concave back surface of the contact lens contained in this particular basket while the convex distal end face of another gripper associated to another basket of the same treatment carrier is arranged a short distance above the concave back surface of the contact lens, so that upon the application of suction the gripper may possibly fail to pick the contact lens up from that other basket to perform the transfer.

Another problem associated with stiff rigid grippers is that the longitudinal axis of individual ones of the grippers for simultaneously picking the contact lenses up from the baskets of the treatment carrier may not perfectly coincide with the longitudinal axis of the associated basket, but may be slightly displaced laterally. Thus, when the gripper reaches the predetermined lowermost position (lens pick-up position) the gripper may be slightly displaced laterally. This may result in the gripper not being able to pick the contact lens at its center which in turn may result in that the gripper may either not pick the contact lens up at all, or even worse the gripper may damage the contact lens which may result in a reduced yield as a damaged contact lens must be sorted out and cannot be transported to the packaging module. In case the contact lens is actually picked up by the gripper, it may occur that the contact lens is getting inverted due to the lens adhering to the basket, for example through water adhering to the lens and/or the basket.

Yet another problem is that depending on the lens-forming material used and/or depending on the type of treatment of the lens in the treatment module (e.g. whether or not the contact lens is coated) it may occur that during blowing the contact lens off of the gripper with the aid of pressurized air while the gripper is immersed in the liquid, small air bubbles may adhere to the back surface of the contact lens which do not detach from the contact lens as the contact lens settles down to the bottom of the inspection cuvette. During subsequent inspection of the contact lens with the aid of image analysis (a camera takes an image of the contact lens which is then analyzed by an image processing algorithm), such small air bubbles adhered to the back surface of the contact lens may be misinterpreted by the image processing algorithm as a possible defect, although the contact lens under inspection is actually free of any defects. As a consequence of this misinterpretation of the small air bubbles, the contact lens is sorted out and is not transferred to the packaging module although it is actually free of any defects. Obviously, this has a negative impact on the production yield.

SUMMARY OF THE INVENTION

It is therefore an object of the present invention to overcome the afore-mentioned disadvantages.

One aspect of the present invention relates to a gripper system for picking an ophthalmic lens up at a start location, transporting the ophthalmic lens to a destination location arranged in a liquid environment, and releasing the ophthalmic lens at the destination location in the liquid environment is suggested. The gripper system comprises a gripper shaft having a hollow inner space extending through the gripper shaft in a longitudinal direction thereof;

a separate suction tube and a separate liquid supply tube extending through the hollow inner space of the gripper shaft towards a distal end of the gripper shaft, with a distal end of the suction tube and a distal end of the liquid supply tube being arranged in the inner space of the gripper shaft at a distance from the distal end of the gripper shaft;

a connecting channel arranged in the inner space of the gripper shaft and fluidically connecting the distal end of the suction tube and the distal end of the liquid supply tube;

a gripper head attached to the gripper shaft at the distal end of the gripper shaft and being configured to be pivotable about a pivot portion of the gripper head, the gripper head having a fluid channel extending through the gripper head in a longitudinal direction thereof from a proximal end of the fluid channel which is fluidically connected to the connecting channel, to a distal end of the fluid channel which opens out into a suction opening centrally arranged in a distal end surface of the gripper head;

a support movably accommodating the gripper shaft relative to the support in the longitudinal direction of the gripper shaft;

a spring mounted between the support and the gripper shaft, the spring biasing the gripper shaft distally away from the support in the longitudinal direction of the gripper shaft;

a vacuum source to which the suction tube is fluidically connected;

a first valve arranged to establish or interrupt the fluidical connection between the vacuum source and the suction tube;

a liquid reservoir to which the liquid supply tube is fluidically connected;

a source of pressurized gas;

a second valve arranged to establish or interrupt a fluidical connection between the source of pressurized gas and either the suction tube or the liquid reservoir to which the liquid supply tube is fluidically connected, for the supply of overpressure to either the suction tube or to the liquid reservoir;

a control unit for controlling the first valve and the second valve such that:

for picking the ophthalmic lens up at the start location and making the ophthalmic lens adhere to the gripper head, the first valve is opened to supply suction to the suction tube and further to the suction opening in the distal end surface of the gripper head;

for transporting the ophthalmic lens adhered to the gripper head to the destination location, the first valve remains open thereby continuing to supply suction to the suction tube and drawing liquid through the liquid supply tube and through the connecting channel into the suction tube to fill the suction tube with the liquid;

for releasing the ophthalmic lens from the gripper head at the destination location, the first valve is closed to interrupt the supply of suction to the suction tube, and the second valve is opened to supply overpressure either to the liquid in the suction tube or to the liquid reservoir to which the liquid supply tube is connected thereby pressing the liquid through the fluid channel extending through the gripper head and through the suction opening centrally arranged in the distal end surface of the gripper head.

In accordance with one aspect of the gripper system according to the invention the gripper head at a proximal end thereof comprises a radially protruding flange. The gripper shaft further comprises a threaded cap having a stepped bore accommodating the radially protruding flange of the gripper head, the radially protruding flange of the gripper head resting on an inner abutment surface of the stepped bore while the rest of the gripper head protrudes distally from the threaded cap. The gripper shaft further comprises a threaded clamping sleeve having a distal clamping surface, the threaded clamping sleeve being screwed into the threaded cap to clamp the radially protruding flange of the gripper head between the distal clamping surface of the threaded clamping sleeve and the inner abutment surface of the stepped bore of the threaded cap. The threaded clamping sleeve further comprises first and second fluid guiding bores extending longitudinally through the clamping sleeve, with the first fluid guiding bore being fluidically connected to the distal end of the suction tube and with the second fluid guiding bore being fluidically connected to the distal end of the liquid supply tube. The threaded clamping sleeve further comprises a transverse fluid guiding channel formed in the distal clamping surface and fluidically connecting the first and second fluid guiding bores. The first fluid guiding bore, the second fluid guiding bore and the transverse fluid guiding channel together form the connecting channel fluidically connecting the distal end of the suction tube and the distal end of the liquid supply tube.

According to a further aspect of the gripper system according to the invention, the gripper system further comprises a suction tube fixation sleeve and a liquid supply tube fixation sleeve. The distal end of the suction tube is fixed in the suction tube fixation sleeve, with the suction tube fixation sleeve having a distal end abutting against a proximal abutment surface of the clamping sleeve, and with the suction tube fixation sleeve being aligned with the first fluid guiding bore of the clamping sleeve to fluidically connect the distal end of suction tube and the first fluid guiding bore of the clamping sleeve. The distal end of the liquid supply tube is fixed in the liquid supply tube fixation sleeve, with the liquid supply tube fixation sleeve having a distal end abutting against the proximal abutment surface of the clamping sleeve, and with the liquid supply tube fixation sleeve being aligned with the second fluid guiding bore of the clamping sleeve to fluidically connect the distal end of the liquid supply tube and the second fluid guiding bore of the clamping sleeve.

According to yet a further aspect of the gripper system according to the invention, the gripper system further comprises a retainer plate having a distal abutment surface abutting against a proximal end of the suction tube fixation sleeve and a proximal end of the liquid supply tube fixation sleeve. The gripper system further comprises a threaded compression piece screwed into the gripper shaft and into the clamping sleeve to press the distal abutment surface of the retainer plate against the proximal end of the suction tube fixation sleeve and the proximal end of the liquid supply tube fixation sleeve to hold the distal end of the suction tube fixation sleeve and the distal end of the liquid supply tube fixation sleeve in abutment with the proximal abutment surface of the clamping sleeve.

Another aspect of the present invention relates to a method for picking an ophthalmic lens up at a start location, transporting the ophthalmic lens to a destination location arranged in a liquid environment, and releasing the ophthalmic lens at the destination location in the liquid environment. The method comprises:

providing a gripper system according to the invention;

providing an ophthalmic lens at the start location;

moving the gripper shaft to the start location and supplying suction to the suction tube without liquid being supplied to the liquid supply tube, thereby supplying suction through the fluid channel extending through the gripper head to the suction opening centrally arranged in the distal end surface of the gripper head, thus picking the ophthalmic lens up and making it adhere to the gripper head;

with the ophthalmic lens adhered to the gripper head, continuing to supply suction to the suction tube thereby drawing liquid from the liquid reservoir through the liquid supply tube and through the connecting channel into the suction tube, thus filling the suction tube with liquid;

moving the gripper shaft with the ophthalmic lens adhered to the gripper head to the destination location in the liquid environment;

at the destination location in the liquid environment, releasing the ophthalmic lens from the gripper head into the liquid environment by interrupting the supply of suction to the suction tube and supplying overpressure either to the liquid in the suction tube or to the liquid in the liquid supply tube, thereby pressing the liquid to flow through the fluid channel extending through the gripper head and through the suction opening centrally arranged in the distal end surface of the gripper head.

In accordance with one aspect of the method according to the invention, the liquid reservoir is pressure compensated and a proximal end of the liquid supply tube is arranged in the pressure compensated liquid reservoir. At the destination location in the liquid environment, overpressure is supplied to the liquid in the suction tube.

According to a further aspect of the method according to the invention, the reservoir comprises a container which is closed by a lid. Pressure compensation of the liquid reservoir is performed through an ambient pressure filter arranged in the lid.

According to another aspect of the method according to the invention, the reservoir comprises a container which is closed pressure-tight by a lid. Pressure compensation of the liquid reservoir is performed through a pressure supply tube having one end thereof arranged in the interior of the container through which pressurized gas is introduced into the interior of the container at a first predetermined pressure.

According to still a further aspect of the method according to the invention, at the destination location in the liquid environment the overpressure is supplied to the liquid in the liquid supply tube by supplying the pressurized gas through the pressure supply tube to the interior of the container at a second predetermined pressure higher than the first predetermined pressure.

According to yet another aspect of the method according to the invention, the reservoir comprises a liquid level sensor. A distal end of a reservoir supply tube is arranged in the reservoir whereas a proximal end of the reservoir supply tube is connected to a liquid source. In case a level of liquid lower than a predetermined threshold level is detected in the reservoir by the liquid level sensor, the supply the of liquid from the liquid source through the reservoir supply tube into the reservoir is triggered.

The gripper system according to the invention offers a number of advantages. First of all, due to being able to release the ophthalmic lens from the gripper head with the aid of liquid rather than by pressurized air at the destination location in the liquid environment, air bubbles adhering to the lens are avoided or at least greatly reduced. Accordingly, lenses free of any defects which have previously been sorted out as being defective due to the misinterpretation of the small air bubbles adhering to the back surface of the lens are no longer sorted out. This increases the production yield.

Second, in the above-described scenario in which a treatment carrier is not perfectly even (e.g. is shaped like a shallow dish) and therefore does not perfectly extend in a horizontal plane (x-y-plane) perpendicular to the axis of movement of the gripper shaft and gripper head (z-axis), the predetermined z-position to which the individual gripper shaft and gripper head (or the plurality of gripper shafts and gripper heads) is moved is chosen such that the (typically convex) distal end surface of the gripper head touches the concave back surface of the lens contained in the respective basket in any event. This means, that in case a plurality of gripper shafts and gripper heads is arranged in a manner corresponding to the arrangement of the baskets of the carrier, all individual gripper shafts and gripper heads of the plurality of gripper shafts and gripper heads may be simultaneously moved to the predetermined z-position. On the way to the predetermined z-position, this may lead to a temporary scenario in which the distal end surface of individual ones of the gripper heads already touches the back surface of the lens contained in the corresponding basket of the treatment carrier while the distal end surface of other gripper heads does not yet touch the back surface of the lenses contained in the corresponding other baskets of the treatment carrier. In such instance, during further movement of the gripper shafts and gripper heads towards the predetermined z-position the spring mounted between the support and the gripper shaft is compressed to avoid damaging of the lens (the spring rate of the spring being appropriately selected to avoid too high a force being applied to the contact lens) while maintaining contact between the distal surface of the gripper head and the concave back surface of the lens. Prior to reaching the predetermined z-position, the distal end surface of each individual gripper head touches the concave back surface of the respective lens contained in the corresponding basket of the treatment carrier. At the time of reaching the predetermined z-position, the spring of each individual gripper is compressed to a greater or lesser extent. Thus, it is ensured that there is good contact between the distal end surface of each individual gripper head and the concave back surface of the respective lens contained in the corresponding basket at the time the gripper shaft and gripper head reaches the predetermined z-position, while at the same time damaging of the lens is avoided. This allows for setting the z-position within a certain range that makes sure that there is good contact between the distal end surface of the gripper head and the lens while at the same time reliably avoiding damaging of the contact lens. Thus, it eliminates or at least greatly reduces the number of failed lens transfers from the baskets of the treatment carriers to the inspection cuvettes caused by a failed pick-up of the lens, and thus increases the production yield.

Also, the gripper system according to the invention is advantageous in situations in which the longitudinal axis of a gripper shaft and gripper head may be slightly displaced laterally relative to the longitudinal axis of the associated basket of the treatment carrier containing the lens. During movement of such laterally displaced gripper shaft and gripper head towards the predetermined z-position, this results in that one or more portions of the concave back surface of the lens are already in contact with the distal end surface of the (slightly laterally displaced) gripper head while other portions of the concave back surface of the lens are not yet in contact with the distal end surface of the gripper head. During further movement of the gripper shaft and gripper head towards the predetermined z-position, this causes the gripper head to pivot about the pivot portion of the gripper head such that the distal end surface of the gripper head adapts to the concave back surface of the contact lens, thus making sure that there is good contact between the distal end surface of the gripper head and the concave back surface of the lens. Upon reaching the predetermined z-position, there is good contact between the distal end surface of each gripper head and the concave back surface of the respective lens contained in the corresponding basket of the treatment carrier, so that all lenses contained in the baskets of the treatment carrier can be reliably picked up upon the application of vacuum.

By way of example, the gripper head may be made from an elastic material having a hardness Shore A in the range of 30 to 90 at room temperature. For example, the elastic material may be silicone rubber, natural rubber or fluorinated rubber.

The gripper system according to the invention is also advantageous in that the number of inverted lenses adhering to the gripper head can be eliminated or at least greatly reduced due to the good contact between the distal end surface of the gripper head and the concave back surface of the lens. This may help eliminating an inverted lens detection station and a lens inversion station in an inspection module of the production line which may otherwise be needed to detect and re-invert an inverted lens prior to placing it into a packaging shell.

However, as mentioned already, an important advantage of the gripper system according to the invention is that during lens inspection the misinterpretation of air bubbles adhering to the concave back surface of the lens as defects is avoided or at least greatly reduced. To better understand this, the process of picking the lens up at the start location (for example from the basket of the treatment carrier), transporting it to the destination location and releasing it in the liquid environment at the destination location (for example in the inspection liquid of an inspection cuvette) is explained in the following.

The lens is picked up at the start location, for example from the afore-mentioned basket of a treatment carrier, by supplying suction to the suction tube. For this purpose, at the time of picking the lens up the control unit of the gripper system according to the invention controls the first valve such that it is open. The suction supplied to the suction tube is then further supplied through the fluid channel extending through the gripper head to the suction opening which is centrally arranged in the distal end surface of the gripper head, thus sucking the lens against the distal end surface of the gripper head.

Once sucked against the distal end surface of the gripper head, the lens adheres to the gripper head. The gripper shaft and gripper head with the lens adhered to the gripper head may then be transferred to the destination location.

As the lens adheres to the gripper head, it essentially closes the suction opening arranged in the distal end surface of the gripper head. Consequently, the continued supply of suction to the suction supply tube causes liquid to be drawn through the liquid supply tube and through the connecting channel into the suction tube. Thus, the air (or any air/liquid mixture) present in the suction tube and sucked towards the vacuum source as long as no lens adheres to the distal end surface of the gripper head is replaced by the liquid drawn into the suction tube, i.e. the suction tube is filled with liquid.

After transfer to the destination location, the lens is released from the gripper in the liquid environment at the destination location (for example in the inspection liquid of the inspection cuvette). For that purpose, the first valve is closed to interrupt the supply of suction to the suction tube, and the second valve is opened to supply overpressure either to the liquid in the suction tube or to the liquid reservoir to which the liquid supply tube is connected. Regardless of whether the overpressure is supplied to the liquid in the suction tube or to the liquid reservoir to which the liquid supply tube is connected, the overpressure supplied presses either the liquid in the suction tube or the liquid in the liquid supply tube (depending on where the overpressure is actually supplied) through the fluid channel extending through the gripper head and through the suction opening in the distal end surface of the gripper head. The lens adhered to the gripper head is thus released from the distal end surface of the gripper head with the aid of liquid so that small air bubbles may not adhere to the back surface of the lens anymore, as releasing the lens is performed with the aid of liquid. As explained already, this avoids that such air bubbles be misinterpreted as defects during subsequent inspection of the lens, and that contact lenses which are actually free of defects be wrongly sorted out as being defective. This, in turn, increases the production yield.

According to an aspect of the gripper system of the invention, the gripper head may have a radially protruding flange at a proximal end thereof. The gripper shaft may comprise a threaded cap having a stepped bore accommodating the radially protruding flange of the gripper head. The radially protruding flange of the gripper head may rest on an inner abutment surface of the stepped bore, while the rest of the gripper head may protrude distally from the threaded cap. The gripper shaft may further comprise a threaded clamping sleeve having a distal clamping surface. The clamping sleeve may be screwed into the threaded cap to clamp the radially protruding flange of the gripper head between the distal clamping surface of the clamping sleeve and the inner abutment surface of the stepped bore. The clamping sleeve may further comprise first and second fluid guiding bore that extend longitudinally through the clamping sleeve. The first fluid guiding bore may be fluidically connected to the distal end of the suction tube, and the second fluid guiding bore may be fluidically connected to the distal end of the liquid supply tube. Finally, the threaded clamping sleeve may comprise a transverse fluid guiding channel that is formed in the distal clamping surface and that fluidically connects the first and second fluid guiding bores. The first and second fluid guiding bores and the transverse fluid guiding channel together may form the connecting channel that fluidically connects the distal end of the suction tube and the liquid supply tube.

This aspect is advantageous since the gripper head with its radially protruding flange can be easily and reliably mounted to the gripper shaft comprising the threaded cap and the threaded clamping sleeve screwed into the threaded cap to clamp the flange. At the same time the connecting channel that fluidically connects the distal end of the suction tube and the distal end of the liquid supply tube is realized in a simple manner from a constructional point of view.

According to a further aspect of the gripper system of the invention, the gripper system may further comprise a suction tube fixation sleeve and a liquid supply tube fixation sleeve. The distal end of the suction tube may be fixed in the suction tube fixation sleeve. The suction tube fixation sleeve may have a distal end that abuts against a proximal abutment surface of the clamping sleeve. The suction tube fixation sleeve may be aligned with the first fluid guiding bore of the clamping sleeve to fluidically connect the distal end of the suction tube and the first fluid guiding bore of the clamping sleeve. Similarly, the distal end of the liquid supply tube may be fixed in the liquid supply tube fixation sleeve. The liquid supply tube fixation sleeve, too, may have a distal end that abuts against a proximal abutment surface of the clamping sleeve. The liquid supply tube fixation sleeve may be aligned with the second fluid guiding bore of the clamping sleeve to fluidically connect the distal end of the liquid supply tube and the second guiding bore of the clamping sleeve. This aspect is advantageous in that it represents a reliable constructional approach of how the distal end of the suction tube and the distal end of the liquid supply tube may be arranged in alignment and in fluidical connection with the first and second fluid guiding bore of the clamping sleeve.

According to yet a further aspect of the gripper system of the invention, the gripper system may further comprise a retainer plate having a distal abutment surface abutting against a proximal end of the suction tube fixation sleeve and a proximal end of the liquid supply tube fixation sleeve. It may further comprise a threaded compression piece screwed into the gripper shaft and into the clamping sleeve to press the retainer plate against the proximal end of the suction tube fixation sleeve and the proximal end of the liquid supply tube fixation sleeve to hold the distal end of the suction tube fixation sleeve and the distal end of the liquid supply tube fixation sleeve in abutment with the proximal abutment surface of the clamping sleeve.

This represents an advantageous constructional approach in which all components of the gripper shaft (and the gripper head) may be assembled to one another in a tightly secured manner without any gaps between the individual components and with smooth and edgeless outer surfaces. Thus, entrainment of liquids possibly adhering to the gripper shaft as well as contamination of the gripper shaft through bacteria or other microorganisms adhering to the gripper shaft can be kept at a minimum.

With respect to the method according to the invention, the advantages are identical to those of the gripper system according to the invention as discussed above, in particular as the method comprises the provision and use of the gripper system according to the invention. Therefore, these advantages are not reiterated.

In one aspect of the method according to the invention, the liquid reservoir is pressure compensated and a proximal end of the liquid supply tube is arranged in the pressure compensated liquid reservoir. At the destination location in the liquid environment overpressure is supplied to the liquid in the suction tube. In such instance, the liquid is drawn through the liquid supply tube and further through the connecting channel into the suction tube by the continued supply of suction to the suction tube. This is possible since the liquid reservoir is pressure compensated. The air in the connecting channel as well as the air in the suction tube is thus replaced by liquid. At the destination location, the contact lens is released from the gripper head by terminating the supply of suction to the suction tube, and by supplying overpressure to the suction tube. As a consequence, the liquid in the suction tube is now pressed through the suction tube and through the fluid channel that extends through the gripper head, thus releasing the contact lens from the gripper head.

In one embodiment of the method according to the invention, this may be achieved such that the reservoir comprises a container which is closed by a lid. Pressure compensation is performed through an ambient pressure filter arranged in the lid. The ambient pressure filter allows (filtered) air to enter the interior of the container so that pressure compensation can be achieved without the risk of contamination of the liquid contained in the reservoir container.

In another embodiment of the method according to the invention, this may be achieved such that the reservoir comprises a container which is closed pressure-tight by a lid. However, unlike in the embodiment described above, pressure compensation of the liquid reservoir is performed through a pressure supply tube having one end thereof arranged in the interior of the container through which pressurized gas is introduced into the interior of the container at a first predetermined pressure. This first predetermined pressure is chosen such that it allows for pressure compensation (for example, the first predetermined pressure is chosen to be at a level of ambient pressure). The advantage here is that no ambient pressure filter needs to be present in the lid of the container, but instead the container can be sealed pressure tight. Obviously, in this embodiment the pressurized gas must be free from any contaminants to avoid contamination of the liquid contained in the reservoir container.

In the afore-described embodiment it is possible that at the destination location in the liquid environment the contact lens may be released from the gripper head by the supply of overpressure to the suction tube (similar to the embodiment in which pressure compensation is performed with the aid of the ambient pressure filter). However, in yet a further embodiment of the method according to the invention at the destination location in the liquid environment the overpressure is supplied to the liquid in the liquid supply tube by supplying the pressurized gas through the pressure supply tube to the interior of the container at a second predetermined pressure higher than the first predetermined pressure. That is, while the supply of suction to the suction tube is terminated, the overpressure is supplied to the liquid supply tube rather than to the suction tube. The liquid is now pressed through the liquid supply tube by the overpressure and, due to the supply of suction being terminated the liquid pressed through the liquid supply tube and further through the fluid channel that extends through the gripper head, thus releasing the contact lens from the gripper head.

According to yet another aspect of the method according to the invention, the reservoir comprises a liquid level sensor. A distal end of a reservoir supply tube is arranged in the reservoir while the proximal end of the reservoir supply tube is connected to a liquid source. In case it is detected by a liquid level sensor that the level of liquid in the reservoir is lower than a predetermined threshold level, the supply of liquid from the liquid source through the reservoir supply tube into the reservoir is triggered. This aspect helps avoiding that there is not enough liquid in the liquid reservoir at any time, thus increasing process safety.

BRIEF DESCRIPTION OF THE DRAWINGS

Further advantageous aspects of the invention will become apparent from the following description of embodiments and aspects of the invention with the aid of the drawings in which:

FIG. 1 shows a perspective view of some details of an embodiment of the gripper system according to the invention and of a carrier comprising a plurality of baskets for carrying contact lenses (one contact lens being shown in one of the baskets);

FIG. 2 shows a side view of the details of the embodiment of the gripper system and the carrier shown in FIG. 1;

FIG. 3 shows an embodiment of some details of the gripper system according to the invention with a plurality of gripper shafts and gripper heads for simultaneously picking up a plurality of contact lenses from a bent carrier;

DETAILED DESCRIPTION OF EMBODIMENTS OF THE INVENTION

Figures 4, 5:
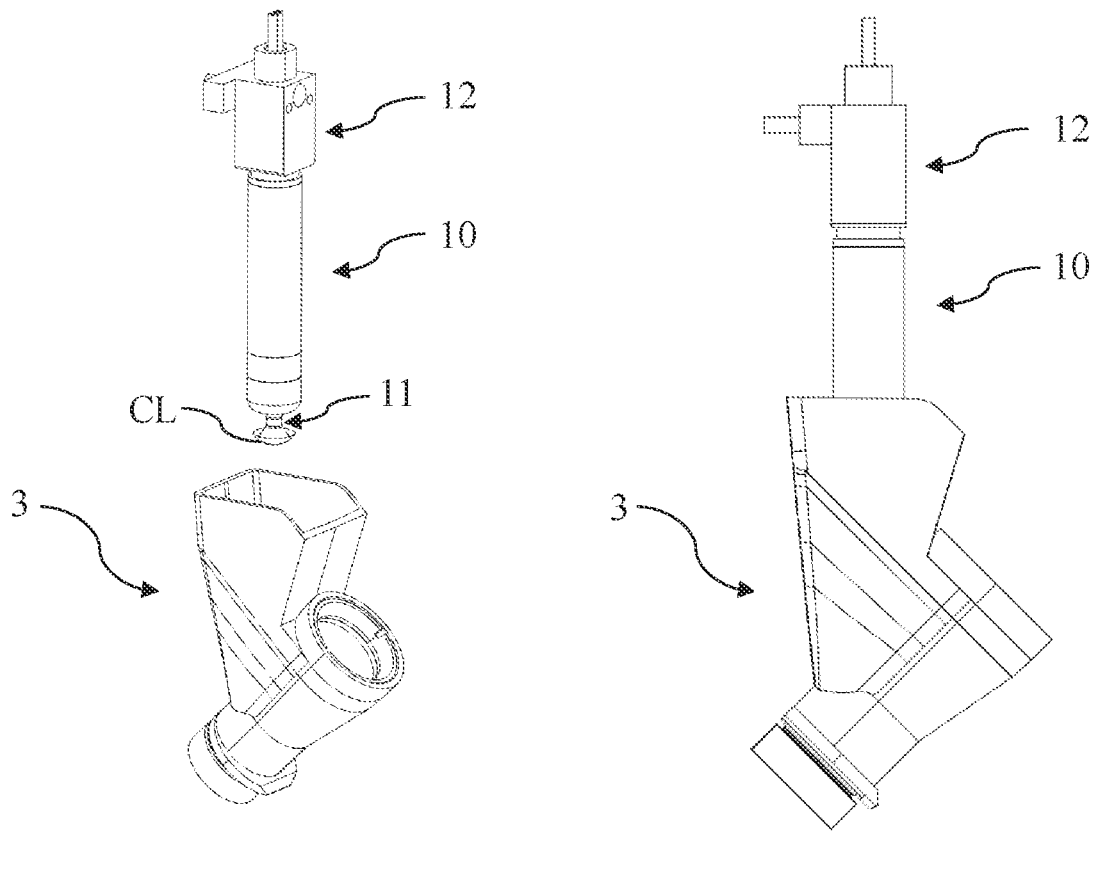
FIG. 4 shows a perspective view of some details of an embodiment of the gripper system according to the invention with a contact lens adhered to the gripper head, with the gripper shaft and gripper head arranged above an inspection cuvette in which the contact lens is to be placed.
FIG. 5 shows a side view of some details of an embodiment of the gripper system according to the invention, with the gripper shaft and gripper head arranged in the inspection cuvette in a position in which the contact lens is to be released from the gripper head.
Figures 6, 7:
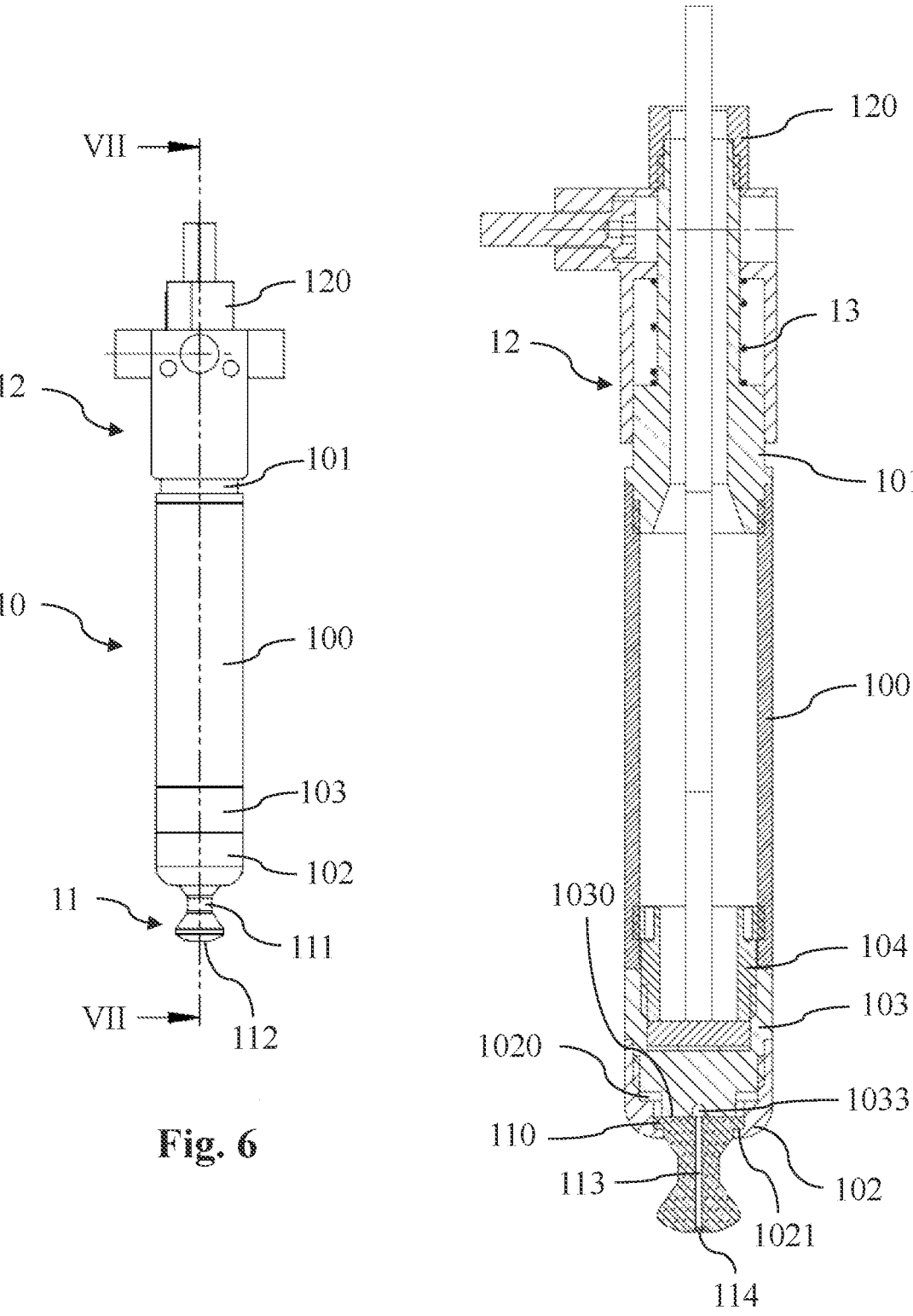
FIG. 6 shows a rear view of some details of an embodiment the gripper system according to the invention.
FIG. 7 shows a sectional view along line VII-VII shown in FIG. 6.
Figures 8, 9:
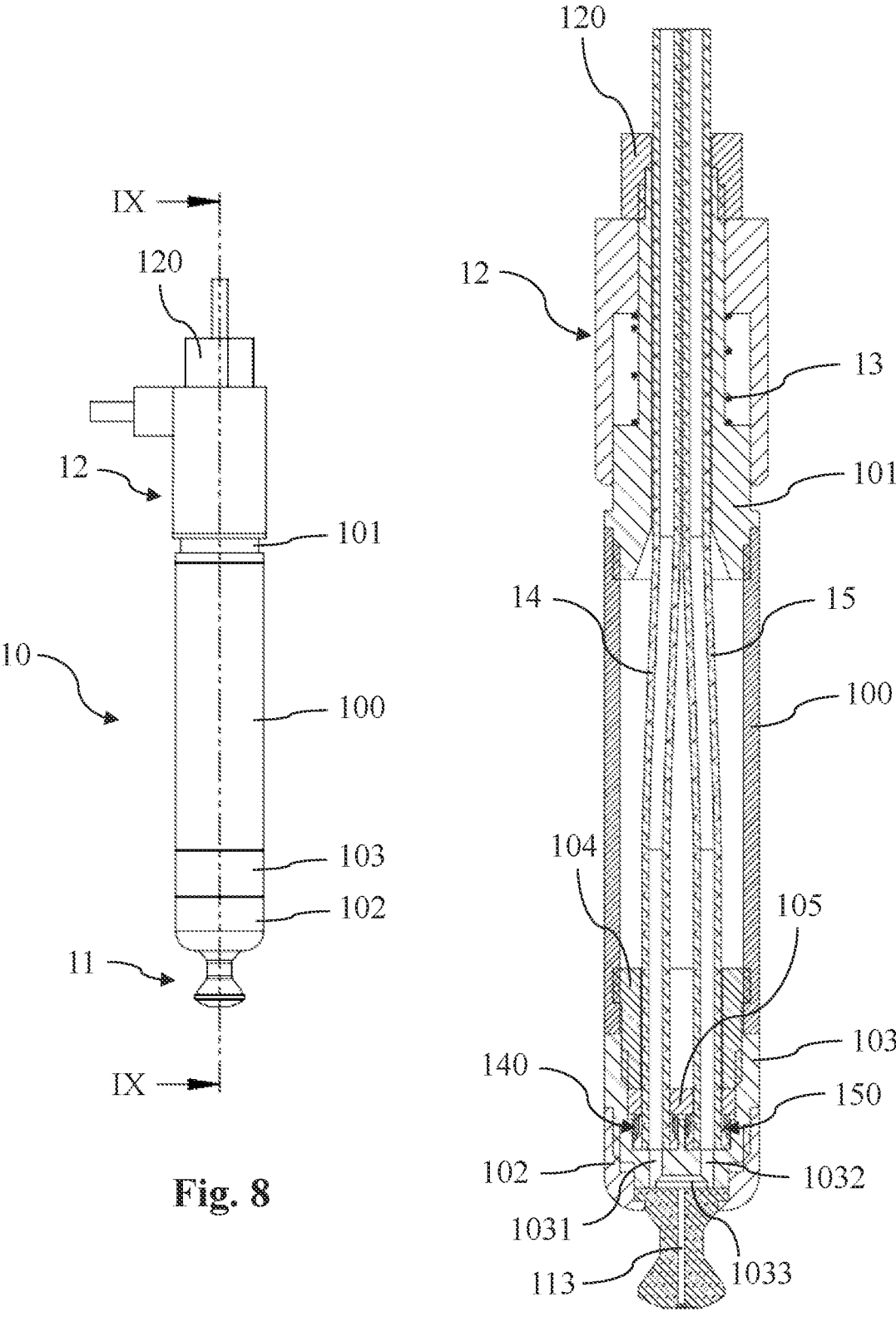
FIG. 8 shows a side view of the details of the embodiment of the gripper system shown in FIG. 6.
FIG. 9 shows a sectional view along line IX-IX of FIG. 8.

FIG. 1 and FIG. 2 show some details of an embodiment of a gripper system 1 according to the invention and of a carrier 2 comprising a plurality of baskets 20, in the embodiment shown twenty such baskets 20, for carrying contact lenses. While only one contact lens CL is shown in one of the baskets 20 for the sake of simplicity of the drawings, in practice for efficiency reasons typically each basket 20 contains a contact lens CL. The contact lens CL is to be picked up from the basket 20 (representing a start location) of the carrier 2. Suitable carriers are described, for example, in WO 2018/185630. Once being picked up, the contact lens CL is to be transported to a destination location in a liquid environment (e.g. an inspection cuvette which is not shown in FIG. 1 and FIG. 2) and is released at the destination location in the liquid environment, as is explained further below.

Gripper system 1 comprises a gripper shaft 10 which is mounted to a support 12 movably accommodating the gripper shaft 10 relative to the support 12 in a longitudinal direction of gripper shaft 10 (indicated by axis A). The gripper system further comprises a gripper head 11 which is attached to gripper shaft 10 at a distal end of gripper shaft 10.

For picking the contact lens CL up, the support 12 together with gripper shaft 10 and gripper head 11 is moved downwards until gripper head 11 is in contact with the contact lens CL and then makes the contact lens CL adhere to the gripper head 11 through the application of suction, as is explained in more detail below.

In FIG. 3 an embodiment of the afore-mentioned details of the gripper system 1 is shown which comprises a plurality of supports 12, gripper shafts 10 and gripper heads 11 which are concurrently moved towards a corresponding number of contact lenses CL contained in a corresponding number of baskets 20, for example the five baskets 20 arranged in a row of carrier 2 (see FIG. 1 and FIG. 2). Unfortunately, the carrier 2 may not be perfectly plane (as shown in FIG. 2) but may be shaped like a shallow dish. This must be taken into account when concurrently moving the supports 12, gripper shafts 10 and gripper heads 11 downwards to pick the contact lenses CL up and make them adhere to the gripper heads, one contact lens CL to each of the gripper heads 11.

After being picked up, the contact lens CL adhered to the gripper head 11 is transported to the destination location in a liquid environment. FIG. 4 shows an inspection cuvette 3 filled with an inspection liquid (e.g. water). Suitable inspection cuvettes are described, for example, in WO 03/016855. The support 12, gripper shaft 10 and gripper head 11 with the contact lens CL adhered thereto is then moved downwards until the gripper head 11 with the contact lens CL adhered thereto is arranged at a location 30 in the inspection liquid 31 contained in the inspection cuvette 3, as shown in FIG. 5 (see also in more detail FIG. 11). At the destination location, the contact lens CL is released from the gripper head 11, as is explained in more detail below.

In the following, the structural features of the components of the embodiment of the gripper system 1 will be described in more detail with the aid of FIG. 6-FIG. 9.

Gripper head 11 has a radially protruding flange 110 at a proximal end of gripper head 11. In addition, gripper head 11 has a pivot portion 111 that renders gripper head 11 pivotable about this pivot portion. At a distal end, gripper head 11 has a distal end surface 112. Gripper head 11 further comprises a fluid channel 113 that extends through gripper head 11 in a longitudinal direction thereof from the proximal end of gripper head 11 to the distal end surface 112, where the fluid channel 113 opens out into a suction opening 114 centrally arranged in the distal end surface 112.

Gripper shaft 10 comprises a hollow tube 100 and a connector piece 101 threadedly mounted at its distal end to a proximal end of hollow tube 100. At a distal end of the hollow tube 100, the gripper shaft 10 comprises a threaded cap 102, a clamping sleeve 103 and a compression piece 104. Compression piece 104, at its proximal end, is threadedly mounted to the distal end of hollow tube 100. At its distal end, compression piece 104 is threadedly mounted to the proximal end of clamping sleeve 103. Clamping sleeve 103, at its distal end, is threadedly mounted to the proximal end of threaded cap 102. Thus, the afore-mentioned components can be assembled in a tightly secured manner without any gaps between the individual components and with smooth and edgeless outer surfaces (see FIG. 6 and FIG. 8). Entrainment of liquids by the gripper shaft 10 as well as contamination of gripper shaft 10 with bacteria or other microorganisms can thus be kept at a minimum.

At its proximal end, connector piece 101 is threadedly secured to support 12 with the aid of a nut 120. A spring 13 is arranged between connector piece 101 and support 12, the spring 13 biasing connector piece 101 (and thereby the whole gripper shaft 10) away from support 12.

Gripper system 1 further comprises a suction tube 14 and a liquid supply tube 15 which extend through the hollow inner space of the gripper shaft 10, or to be more precise through the hollow inner space of hollow tube 100. The distal end of suction tube 14 is fixed in a suction tube fixation sleeve 140, and the distal end of liquid supply tube 15 is fixed in a liquid supply tube fixation sleeve 150 (see FIG. 9).

Assembly of the gripper head 11, the threaded cap 102, the clamping sleeve 103 and the compression piece 104 for mounting these assembled components to the hollow tube 100 is now described.

Threaded cap 102 comprises a stepped bore 1020 with an inner abutment surface 1021. At its proximal end, gripper head 11 comprises the already describe radially protruding flange 110. This radially protruding flange 110 rests on the inner abutment surface 1021 of the stepped bore 1020 of threaded cap 102, while the rest of the gripper head 11 protrudes distally from the threaded cap 102.

Clamping sleeve 103 is then screwed into the threaded cap 102 to clamp the radially protruding flange 110 of gripper head 11 against the inner abutment surface 1021 of the stepped bore 1020 of threaded cap 102. This is achieved with the aid of a distal clamping surface 1030 of the clamping sleeve 103. Clamping sleeve 103 further comprises a first fluid guiding bore 1031 and a second fluid guiding bore 1032 each of which extends longitudinally through the clamping sleeve 103 (see FIG. 9).

In addition, clamping sleeve 103 comprises a transverse fluid guiding channel 1033 formed in the distal clamping surface 1030, the transverse fluid guiding channel 1033 fluidically connecting the first fluid guiding bore 1031 and the second fluid guiding bore 1032 of clamping sleeve 103.

The suction tube fixation sleeve 140 at the distal end of the suction tube 14 has a distal end that abuts against a proximal abutment surface of the clamping sleeve 103 such that the suction tube fixation sleeve 140 is aligned with the first fluid guiding bore 1031 to establish a fluidical connection between the distal end of suction tube 14 and the first fluid guiding bore 1031. Similarly, the liquid supply tube fixation sleeve 150 at the distal end of the liquid supply tube 15 has a distal end that abuts against the proximal abutment surface of the clamping sleeve 103 such that the liquid supply tube fixation sleeve 140 is aligned with the second fluid guiding bore 1032 to establish a fluidical connection between the distal end of liquid supply tube 15 and the second fluid guiding bore 1032.

To hold the suction tube fixation sleeve 140 and the liquid supply tube fixation sleeve in place, the gripper system further comprises a retainer plate 105. Retainer plate 105 has a distal abutment surface that abuts against a proximal end of suction tube fixation sleeve 140 and liquid supply tube fixation sleeve 150. Threaded compression piece 104 is screwed into the clamping piece 103 at the proximal end of clamping sleeve 103 until retainer plate 105 is pressed against the proximal end of suction tube fixation sleeve 140 and the proximal end of liquid supply tube fixation sleeve 150. Thus, the distal end of suction tube fixation sleeve 140 and the distal end of liquid supply tube fixation sleeve are held in abutment with the proximal abutment surface of clamping sleeve 103.

The thus assembled gripper head 11, threaded cap 102, clamping sleeve 103, compression piece 104 and retainer plate 105 are then mounted to the distal end of hollow tube 100 by screwing the threaded proximal end of compression piece 104 into the hollow tube 100. Thus, by means of the first fluid guiding bore 1031, the second fluid guiding bore 1032 and the transverse fluid guiding channel 1033 a connecting channel is formed that fluidically connects the distal ends of the suction tube 14 and the liquid supply tube 15 which are securely held in place with the aid of the suction tube fixation sleeve 140, the liquid supply tube fixation sleeve 150 and the retainer plate 105. As the transverse fluid guiding channel 1033 is fluidically connected to fluid channel 113 extending through gripper head 11, the fluid channel 113 of gripper head 11 is also connected to this connecting channel.

Figure 10:
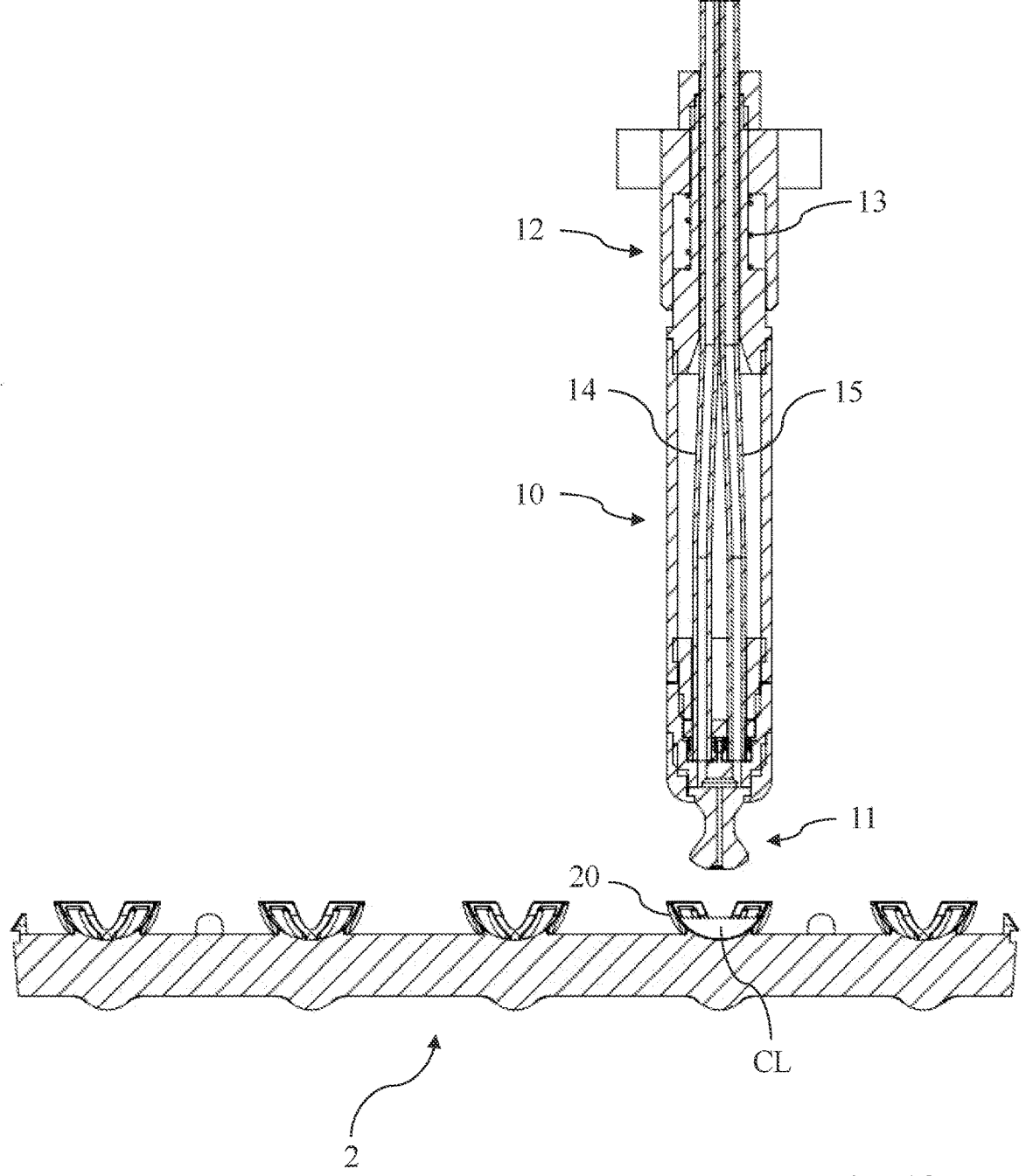
FIG. 10 shows a sectional view of the details of the gripper system and the carrier shown in FIG. 2, with a contact lens to be picked up being arranged in one of the baskets of the carrier.

Operation of the gripper system is described in the following, first in a more general manner with the aid of FIG. 10-FIG. 12. In FIG. 10, some components of the gripper system are shown above the carrier 2 (with the carrier 2 being show perfectly plane). For picking the contact lens CL contained in the basket 20 of carrier 2 up, the support 12 with the gripper shaft 10 attached thereto and the gripper head 11 is lowered to a predetermined z-position. Once gripper head 11 contacts the concave back surface of the contact lens CL contained in basket 20, further movement of support 12 to the predetermined z-position causes compression of the spring 13. Thus, damaging of the contact lens CL is avoided.

In case carrier 2 is not perfectly plane but is shaped like a shallow dish (see FIG. 12) and a plurality of contact lenses is to be concurrently picked up, the outermost left and the outermost right gripper head 11 are the first ones that come into contact with the concave back surface of the respective contact lens CL contained in the associated outermost left and outermost right basket 20. At that time the three innermost gripper heads 11 are not yet in contact with the back surface of the respective contact lens CL in the associated three innermost baskets 20.

Turning back to the outermost right and outermost left gripper heads 11, these gripper heads 11 are not centrally aligned with the respective contact lens CL. However, due to the respective gripper head 11 being pivotable about its pivot portion 111, upon further movement of the supports 12 in the z-direction (i.e. downwards) the respective outermost left and outermost right gripper head 11 pivots about its pivot portion 111, respectively, so that the orientation of the gripper head 11 changes to correspond to the orientation of the contact lens CL contained in the respective basket 20. Upon further movement of the supports 12 in the z-direction, the two gripper heads 11 next to the outermost right and outermost left gripper heads 11 come into contact with the concave back surface of respective contact lens CL contained in the associated basket 20, and pivot about their pivot portion 111 to adapt their orientation to that of the contact lens CL contained in the respective basket 20. Finally, upon further movement of the supports 12 in the z-direction, the centrally arranged gripper head 11 comes into contact with the back surface of the contact lens CL contained in the centrally arranged basket 20. At the predetermined z-position to which the supports 12 are moved, the springs 13 of all grippers are compressed to some extent so that there is good contact between each of the gripper heads 11 and the contact lens CL contained in the associated basket 20. The gripper system is now ready for picking all contact lenses CL up.

The process of picking a contact lens CL up is described again with reference to FIG. 10. Let us assume that the gripper head 11 is in contact with the back surface of the contact lens CL contained in the basket 20 and the spring 13 is compressed to some extent, making sure there is good contact. Suction is now supplied to the suction tube 14. At that time, no liquid is supplied to the liquid supply tube 15. The supply of suction to suction tube 14 makes the contact lens CL adhere to the gripper head 11, and the suction opening 114 in the distal end surface 112 of the gripper head 11 is substantially closed by the contact lens CL. The contact lens CL adhered to the gripper head 11 may now be transferred to the destination location in the liquid environment, for example to the inspection cuvette 3, see FIG. 11 (also FIG. 4 and FIG. 5).

At the destination location 30 (at which the gripper head 11 is fully immersed in the liquid 31 contained in inspection cuvette 3), the contact lens CL is released from the gripper head 11. As has been described already, the contact lens CL is released from gripper head 11 with the aid of liquid which is pressed through the fluid channel 113 and suction opening 114 of gripper head 11.

This means, that after picking the contact lens CL up and prior to releasing the contact lens CL from gripper head 11, the suction tube 14 and the liquid supply tube 15 as well as connecting channel comprising the first fluid guiding bore 1031, the second fluid guiding bore 1032, and the transverse channel 1033 must be filled with liquid. Exemplary ways how this may be achieved are explained in the following with the aid of FIG. 13 and FIG. 14.

Figure 13:
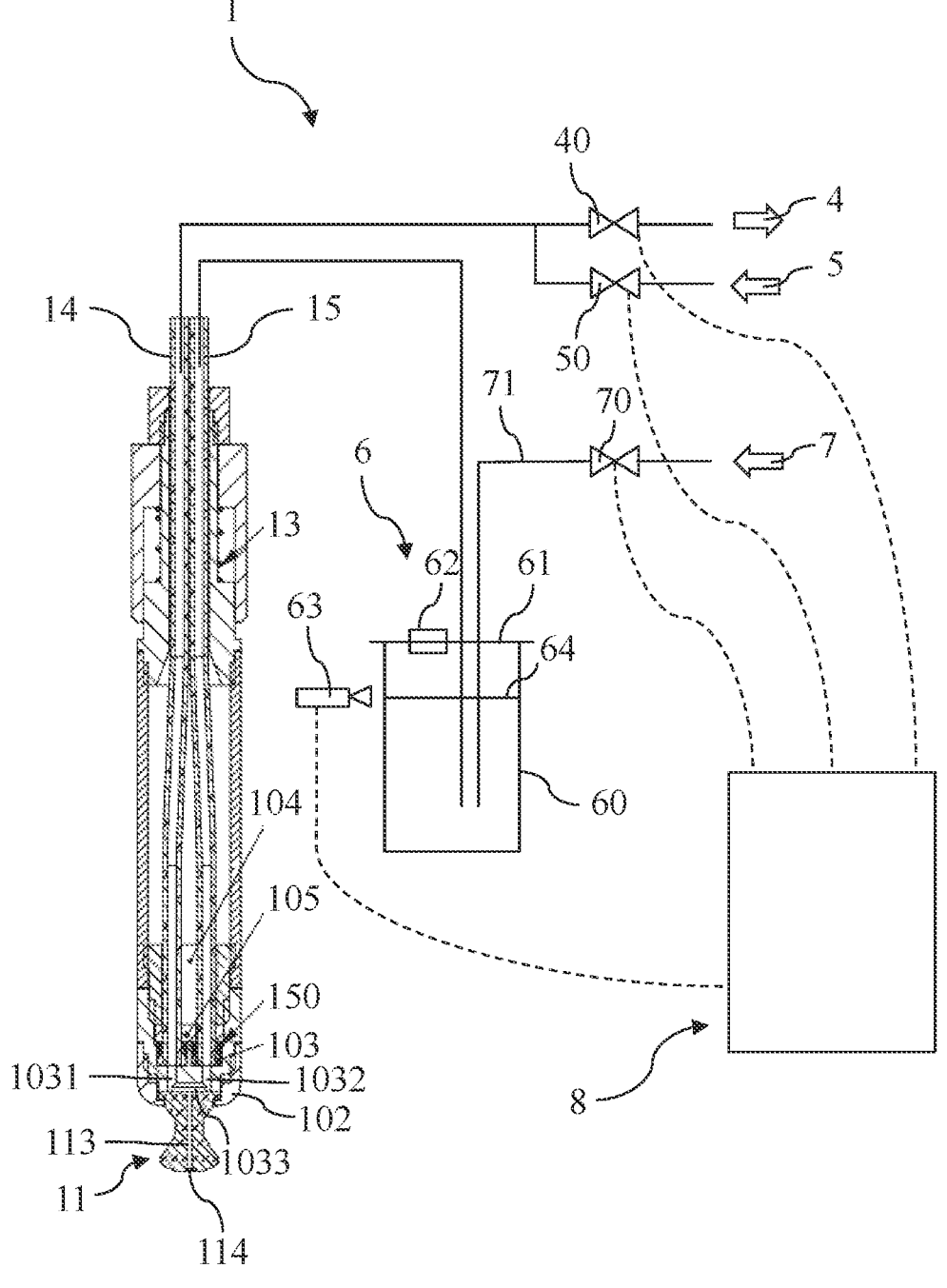
FIG. 13 show a schematic overview of an embodiment of the gripper system according to the invention.

In the embodiment shown in FIG. 13, the gripper system 1—in addition to the components already described before—further comprises a vacuum source 4 to which suction tube 14 is fluidically connected. Vacuum source 4 is schematically indicated by an arrow and comprises a liquid separator (not shown). A first valve 40 may establish or interrupt the fluidical connection between the vacuum source 4 and the suction tube 14. Gripper system 1 further comprises a source 5 of pressurized gas which is again indicated schematically by an arrow. A second valve 50 may establish or interrupt a fluidical connection between the source 5 of pressurized gas and suction tube 4.

Gripper system 1 further comprises a liquid reservoir 6 to which liquid supply tube 15 is connected. Liquid reservoir 6 comprises a container 60 which is closed by a lid 61. An ambient pressure filter 62 is arranged in the lid 61 and allows for pressure compensation of the liquid reservoir 6. A liquid level sensor 63 is provided for monitoring the level of the liquid 64 in container 60.

Gripper system 1 further comprises a reservoir supply tube 71 the proximal end of which is connected to a liquid source 7 which is indicated by an arrow. The distal end of reservoir supply tube 71 is arranged in the reservoir 6, more precisely in the inner space of the container 61. A valve 70 opens and closes a fluidical connection between the liquid source 7 and the reservoir 6. In case liquid level sensor 63 detects that the level of the liquid 64 in the container 61 is lower than a predetermined threshold level, a corresponding signal is generated and triggers Control unit 8 to open valve 70 to allow replenishment of the reservoir 6.

Operation of this embodiment of gripper system 1 is described in the following, assuming that the contact lens CL has already been picked up by suppling suction to suction tube 14, thus making the contact lens CL adhere to the gripper head 11 and thereby closing the suction opening 114. Continued supply of suction to suction tube 14 draws liquid 64 from the container 60 through the liquid supply tube 15, through the second fluid guiding bore 1032, through the transverse fluid guiding channel 1033, through the first fluid guiding bore 1031 and into suction tube 14, thus filling suction tube 14 with liquid. The pressure in the container 60 is compensated through the ambient pressure filter 62 in the lid 61 during this process.

Figure 11:
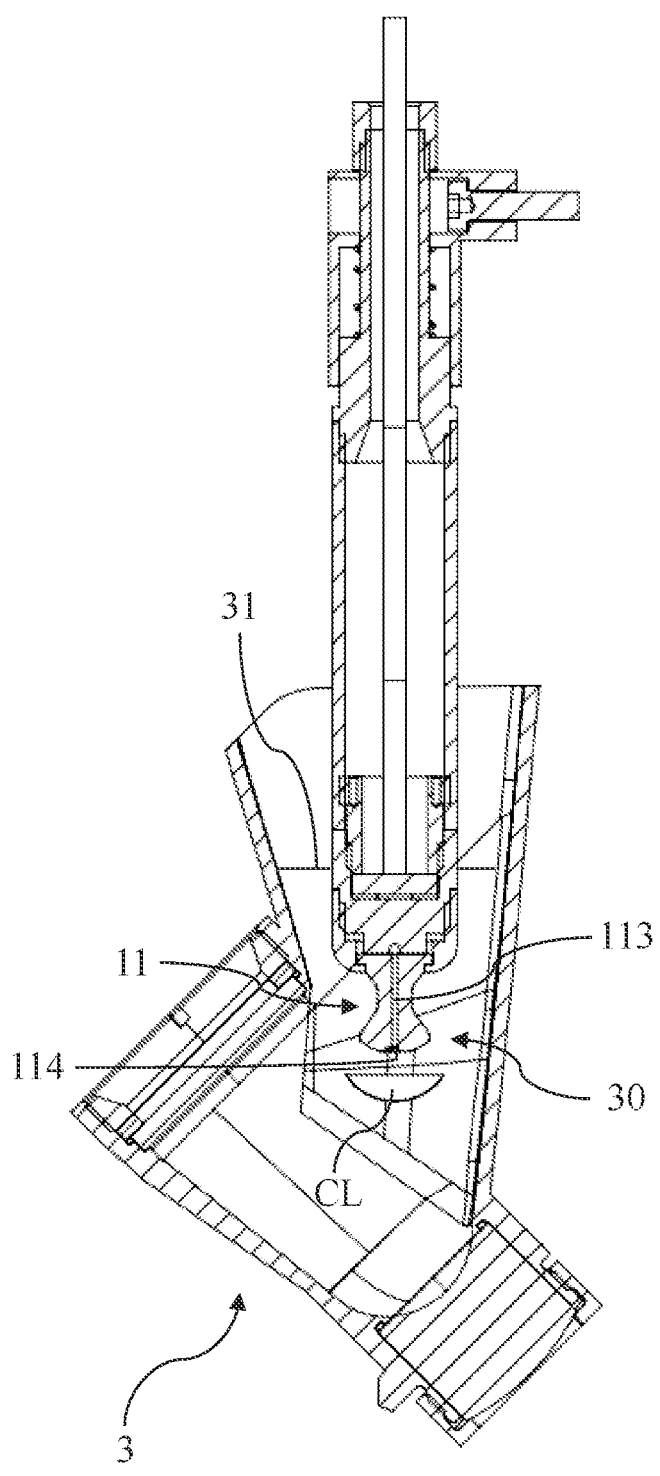
FIG. 11 shows a sectional view of the details of the gripper system and of an inspections cuvette, with the gripper shaft and gripper head being arranged in the inspection cuvette at the time of releasing the contact lens from the gripper head.
Figure 12:
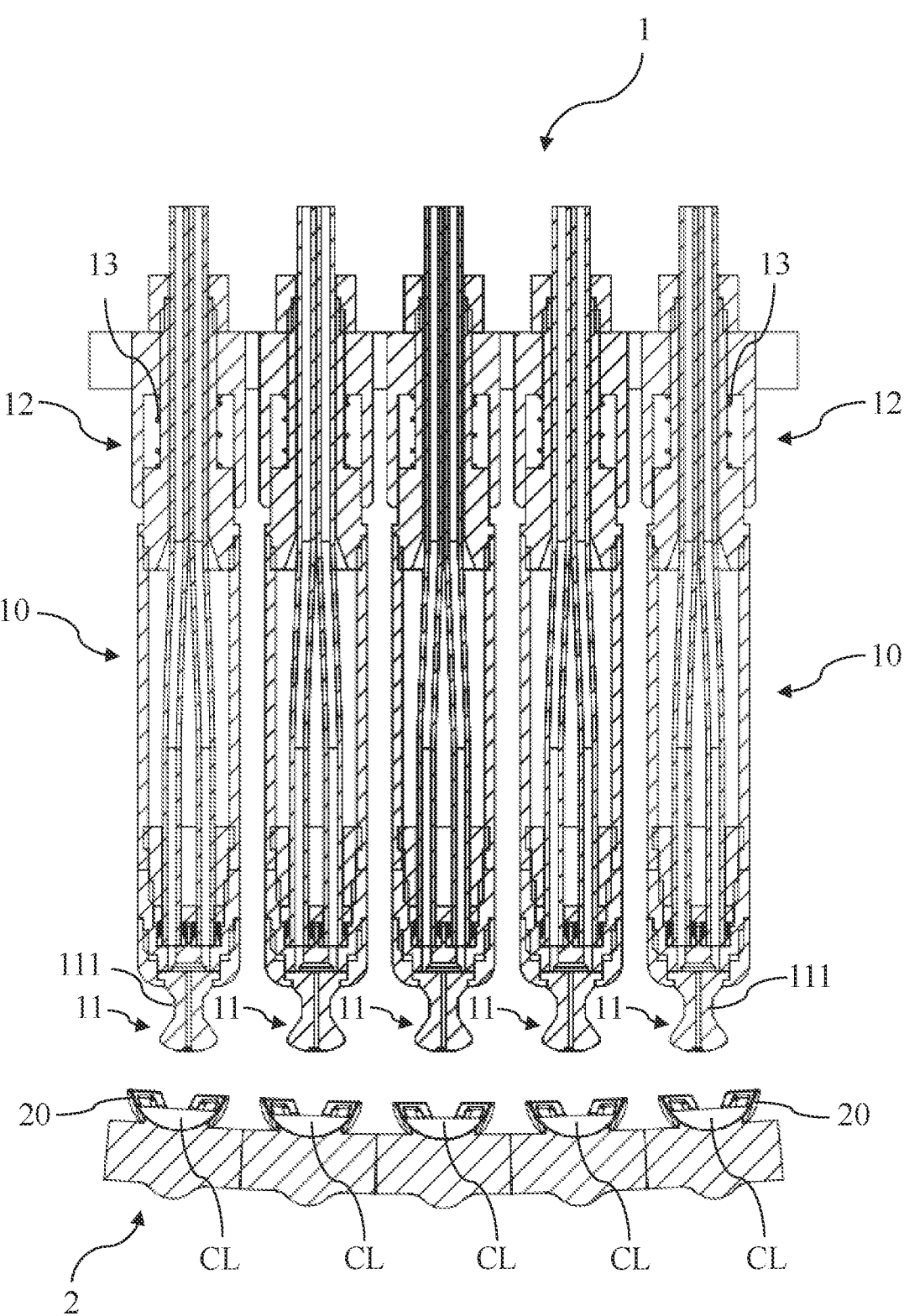
FIG. 12 shows a sectional view of the embodiment of the gripper system shown in FIG. 3 comprising a plurality of gripper shafts and gripper heads above a bent carrier with contact lenses to be picked up being arranged in the baskets of the bent carrier.

At the destination location 30, when the gripper head 11 and the contact lens CL adhered thereto are arranged in the liquid 31 contained in the inspection cuvette 3, the contact lens CL must be released from the gripper head 11 (see FIG. 11). In the embodiment of FIG. 13, this is achieved by the control unit 8 sending a corresponding signal to close the first valve 40 thereby interrupting the fluidical connection between the vacuum source 4 and the suction tube 14. Thereafter, the control unit 8 sends a signal to the second valve 50 to open the second valve 50 and thereby establish a fluidical connection between the source of pressurized gas 5 and the suction tube 14. An overpressure pulse is thus supplied to the liquid in the suction tube 4, pressing this liquid back through the first fluid guiding bore 1031, the transverse fluid guiding channel 1033, and further through the fluid channel 113 and the suction opening 114 of gripper head 11 against the back surface of the contact lens CL. The contact lens CL is thus released from the gripper head 11 by the liquid (to which the overpressure is supplied) rather than by pressurized air, as this has been done in the past. Thereby, it is avoided that air bubbles may stick to the back surface of the contact lens CL since the contact lens CL is released from the gripper by liquid rather than by air. As a consequence, air bubbles possibly adhering to the back surface of the released contact lens CL which have been misinterpreted as defects during the subsequent optical inspection of the contact lens in the inspection cuvette 3 are avoided. Once the contact lens CL has been released from the gripper head 11 and the gripper head 11 has been removed from the inspection cuvette 3, the control unit 8 sends a signal to the second valve 50 to close the second valve 50, thus interrupting the fluidical connection between the suction tube 14 and the source of pressurized gas 5 again. After the gripper head 11 is removed from the inspection cuvette 3 again, i.e. during the way back to pick the next contact lens CL up from a basket 20 of the carrier 2, the control unit 8 sends a signal to first valve 40 to open first valve 40, thereby establishing the fluidical connection between the suction tube 14 and the vacuum source 4 again. Air is then sucked in through the suction opening 114 of gripper head 11, and liquid contained in the fluidic path between the suction opening 114 of gripper head 11 and the vacuum source 4 is then sucked towards the vacuum source 4 where it is separated by the liquid separator of the vacuum source 4. Thus, at the time the gripper head 11 arrives at the carrier 2 to pick the next contact lens CL up from the basket 20 of carrier 2, air is sucked in again through the suction opening 114 to pick the next contact lens CL up and make it adhere to the gripper head 11 for being transported to the inspection cuvette 3, as this is described above.

Figure 14:
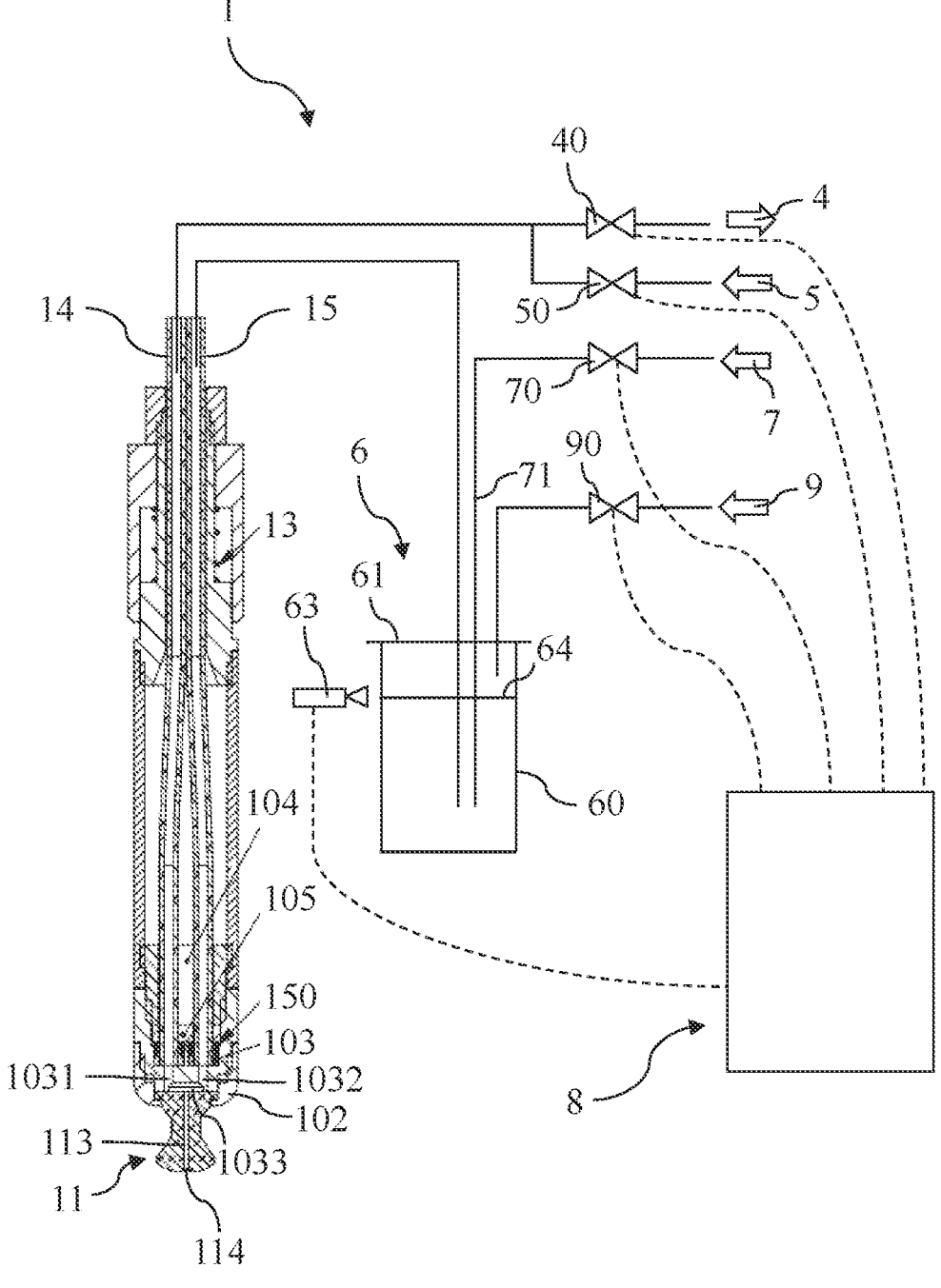
FIG. 14 show a schematic overview of another embodiment of the gripper system according to the invention.

The embodiment of gripper system 1 shown in FIG. 14 is generally similar to the embodiment shown in FIG. 13. For that reason, like components are assigned like reference numbers. However, instead of having an ambient pressure filter 62 arranged in the lid 61, container 60 is closed in a pressure-tight manner by the lid 61. Thus, the interior of container 60 is completely separated from the ambient thus avoiding a possible contamination of the liquid 64 contained in container 60. For pressure compensation, this embodiment of gripper system 1 comprises a pressure supply tube having its distal end arranged in the inner space of container 60. Through this pressure supply tube pressurized gas 9 may be introduced into the interior of container 60 at a first predetermined pressure which is chosen such as to compensate the pressure in the interior of the container 60. A valve 90 may be controlled by control unit 8 to allow or not allow the pressurized gas 9 to flow into the interior of container 60. In general, the mode of operation may then be the same as that described above in connection with FIG. 13, except that pressure compensation in the interior of container 6 is achieved differently.

In an alternative mode of operation, releasing the contact lens CL from the gripper head 11 at the destination location 30 in the liquid 31 contained in the inspection cuvette 3 (i.e. after the first valve 40 has been closed and the supply of vacuum from vacuum source 4 is interrupted) may be achieved differently. In this alternative mode of operation, control unit 8 may open valve 90 to allow pressurized gas to flow through the pressure supply tube into the interior of container 6 at a second predetermined pressure (i.e. at an overpressure) which is higher than the first predetermined pressure (that is used for pressure compensation). The thus generated overpressure in the interior of the container 6 presses the liquid through the liquid supply tube 15, second fluid guiding bore 1032, transverse fluid guiding channel 1033, and finally through fluid channel 113 and suction opening 14 of the gripper head 11. Thus, the contact lens CL is released from the gripper head 11 by liquid, as in the other mode of operation described above. However, in this case the overpressure pulse is supplied to the interior of the container 6 and thus to the liquid in the liquid supply tube 15. Of course, it is also possible that the control unit 8 concurrently opens valve 50 to allow overpressure to be applied to the to the liquid contained in the suction tube 14 as well. In this case, overpressure is supplied to the liquid contained in the suction tube 14 as well as to the liquid contained in liquid supply tube 15. This may further improve the process of releasing the contact lens CL from the gripper head 11.

While embodiments of the invention have been described with the aid of the drawings, the person skilled in the art understands that many changes and modifications are possible without departing from the teaching underlying the invention. Therefore, the scope of protection is not limited to the embodiments described but is defined by the appended claims.

The invention claimed is:

1. Gripper system (1) for picking an ophthalmic lens (CL) up at a start location (20), transporting the ophthalmic lens (CL) to a destination location (30) arranged in a liquid environment, and releasing the ophthalmic lens (CL) at the destination location (30) in the liquid environment, the gripper system (1) comprising a gripper shaft (10) having a hollow inner space extending through the gripper shaft in a longitudinal direction thereof;

a separate suction tube (14) and a separate liquid supply tube (15) extending through the hollow inner space of the gripper shaft (10) towards a distal end of the gripper shaft, with a distal end of the suction tube (14) and a distal end of the liquid supply tube (15) being arranged in the inner space of the gripper shaft at a distance from the distal end of the gripper shaft;

a connecting channel arranged in the inner space of the gripper shaft (10) and fluidically connecting the distal end of the suction tube (14) and the distal end of the liquid supply tube (15);

a gripper head (11) attached to the gripper shaft (10) at the distal end of the gripper shaft and being configured to be pivotable about a pivot portion (111) of the gripper head (11), the gripper head having a fluid channel (113) extending through the gripper head (11) in a longitudinal direction thereof from a proximal end of the fluid channel (113) which is fluidically connected to the connecting channel, to a distal end of the fluid channel (113) which opens out into a suction opening (14) centrally arranged in a distal end surface (112) of the gripper head (11);

a support (12) movably accommodating the gripper shaft (10) relative to the support (12) in the longitudinal direction (A) of the gripper shaft (10);

a spring (13) mounted between the support (12) and the gripper shaft (10), the spring (13) biasing the gripper shaft (10) distally away from the support (12) in the longitudinal direction of the gripper shaft (12);

a vacuum source (4) to which the suction tube (14) is fluidically connected;

a first valve (40) arranged to establish or interrupt the fluidical connection between the vacuum source (4) and the suction tube (14);

a liquid reservoir (6) to which the liquid supply tube (15) is fluidically connected;

a source of pressurized gas (5, 9);

a second valve (50, 90) arranged to establish or interrupt a fluidical connection between the source of pressurized gas (5, 9) and either the suction tube (14) or the liquid reservoir (6) to which the liquid supply tube (15) is fluidically connected, for the supply of overpressure to either the suction tube (14) or to the liquid reservoir (6);

a control unit (8) for controlling the first valve (40) and the second valve (50, 90) such that:

for picking the ophthalmic lens (CL) up at the start location (20) and making the ophthalmic lens (CL) adhere to the gripper head (11), the first valve (40) is opened to supply suction to the suction tube (14) and further to the suction opening (114) in the distal end surface (112) of the gripper head (11);

for transporting the ophthalmic lens (CL) adhered to the gripper head (11) to the destination location (30), the first valve (40) remains open thereby continuing to supply suction to the suction tube (14) and drawing liquid through the liquid supply tube (15) and through the connecting channel into the suction tube (14) to fill the suction tube (14) with the liquid;

for releasing the ophthalmic lens (CL) from the gripper head (11) at the destination location (30), the first valve (40) is closed to interrupt the supply of suction to the suction tube (14), and the second valve (50, 90) is opened to supply overpressure either to the liquid in the suction tube (14) or to the liquid reservoir (6) to which the liquid supply tube (15) is connected thereby pressing the liquid through the fluid channel (113) extending through the gripper head (11) and through the suction opening (114) centrally arranged in the distal end surface (112) of the gripper head (11).

2. Gripper system according to claim 1, wherein the gripper head (11) at a proximal end thereof comprises a radially protruding flange (110), wherein the gripper shaft (10) further comprises a threaded cap (102) having a stepped bore (1020) accommodating the radially protruding flange (110) of the gripper head, the radially protruding flange (110) of the gripper head (11) resting on an inner abutment surface (1021) of the stepped bore (1020) while the rest of the gripper head (11) protrudes distally from the threaded cap (102), and wherein the gripper shaft (10) further comprises a threaded clamping sleeve (103) having a distal clamping surface (1030), the threaded clamping sleeve (103) being screwed into the threaded cap (102) to clamp the radially protruding flange (110) of the gripper head (11) between the distal clamping surface (1030) of the threaded clamping sleeve (103) and the inner abutment surface (1021) of the stepped bore (1020) of the threaded cap (102), the threaded clamping sleeve (103) further comprising first and second fluid guiding bores (1031, 1032), extending longitudinally through the clamping sleeve (103), with the first fluid guiding bore (1031) being fluidically connected to the distal end of the suction tube (14) and with the second fluid guiding bore (1032) being fluidically connected to the distal end of the liquid supply tube (14), the threaded clamping sleeve (130) further comprising a transverse fluid guiding channel (1033) formed in the distal clamping surface (1030) and fluidically connecting the first and second fluid guiding bores (1031, 1032), the first fluid guiding bore (1031), the second fluid guiding bore (1032) and the transverse fluid guiding channel (1033) together forming the connecting channel fluidically connecting the distal end of the suction tube (14) and the distal end of the liquid supply tube (15).

3. Gripper system according to claim 2, further comprising a suction tube fixation sleeve (140) and a liquid supply tube fixation sleeve (150), wherein the distal end of the suction tube (14) is fixed in the suction tube fixation sleeve (140), with the suction tube fixation sleeve (140) having a distal end abutting against a proximal abutment surface of the clamping sleeve (103), and with the suction tube fixation sleeve (140) being aligned with the first fluid guiding bore (1031) of the clamping sleeve (103) to fluidically connect the distal end of suction tube (14) and the first fluid guiding bore (1031) of the clamping sleeve (103), and wherein the distal end of the liquid supply tube (15) is fixed in the liquid supply tube fixation sleeve (150), with the liquid supply tube fixation sleeve (150) having a distal end abutting against the proximal abutment surface of the clamping sleeve (103), and with the liquid supply tube fixation sleeve (150) being aligned with the second fluid guiding bore (1032) of the clamping sleeve (103) to fluidically connect the distal end of the liquid supply tube (15) and the second fluid guiding bore (1032) of the clamping sleeve (103).

4. Gripper system according to claim 3, further comprising a retainer plate (105) having a distal abutment surface abutting against a proximal end of the suction tube fixation sleeve (140) and a proximal end of the liquid supply tube fixation sleeve (150), and further comprising a threaded compression piece (104) screwed into the gripper shaft and into the clamping sleeve (103) to press the distal abutment surface of the retainer plate (104) against the proximal end of the suction tube fixation sleeve (140) and the proximal end of the liquid supply tube fixation sleeve (150) to hold the distal end of the suction tube fixation sleeve (140) and the distal end of the liquid supply tube fixation sleeve (150) in abutment with the proximal abutment surface of the clamping sleeve (103).

5. Method for picking an ophthalmic lens (CL) up at a start location (20), transporting the ophthalmic lens (CL) to a destination location (30) arranged in a liquid environment, and releasing the ophthalmic lens (CL) at the destination location (30) in the liquid environment, the method comprising:

providing a gripper system (1) according to any one of the preceding claims;

providing an ophthalmic lens (CL) at the start location (20);

moving the gripper shaft (10) to the start location and supplying suction to the suction tube (14) without liquid being supplied to the liquid supply tube (15), thereby supplying suction through the fluid channel extending through the gripper head (11) to the suction opening (114) centrally arranged in the distal end surface (112) of the gripper head (11), thus picking the ophthalmic lens (CL) up and making it adhere to the gripper head (11);

with the ophthalmic lens (CL) adhered to the gripper head (11), continuing to supply suction to the suction tube (14) thereby drawing liquid from the liquid reservoir (6) through the liquid supply tube (15) and through the connecting channel into the suction tube (14), thus filling the suction tube (14) with liquid;

moving the gripper shaft (10) with the ophthalmic lens (CL) adhered to the gripper head (11) to the destination location (30) in the liquid environment;

at the destination location (30) in the liquid environment, releasing the ophthalmic lens (CL) from the gripper head (11) into the liquid environment by interrupting the supply of suction to the suction tube (14) and supplying overpressure either to the liquid in the suction tube (14) or to the liquid in the liquid supply tube (15), thereby causing the liquid to flow through the fluid channel (113) extending through the gripper head (11) and through the suction opening (114) centrally arranged in the distal end surface (112) of the gripper head (11).

6. Method according to claim 5, wherein the liquid reservoir (6) is pressure compensated and a proximal end of the liquid supply tube (15) is arranged in the pressure compensated liquid reservoir, and wherein at the destination location (30) in the liquid environment overpressure is supplied to the liquid in the suction tube (14).

7. Method according to claim 6, wherein the reservoir (6) comprises a container (60) which is closed by a lid (61), and wherein pressure compensation of the liquid reservoir is performed through an ambient pressure filter (62) arranged in the lid (61).

8. Method according to claim 6, wherein the reservoir (6) comprises a container (60) which is closed pressure-tight by a lid (61), and wherein pressure compensation of the liquid reservoir is performed through a pressure supply tube having one end thereof arranged in the interior of the container (6) through which pressurized gas (9) is introduced into the interior of the container (60) at a first predetermined pressure.

9. Method according to claim 8, wherein at the destination location (30) in the liquid environment the overpressure is supplied to the liquid in the liquid supply tube (15) by supplying the pressurized gas (9) through the pressure supply tube to the interior of the container (60) at a second predetermined pressure higher than the first predetermined pressure.

10. Method according to claim 5, wherein the reservoir comprises a liquid level sensor (63), and wherein a distal end of a reservoir supply tube is arranged in the reservoir whereas a proximal end of the reservoir supply tube is connected to a liquid source (7), and wherein in case a level of liquid lower than a predetermined threshold level is detected in the reservoir by the liquid level sensor (63), the supply of liquid from the liquid source (7) through the reservoir supply tube into the reservoir is triggered.

* * * * *